United States Patent Office 3,153,063
Patented Oct. 13, 1964

3,153,063
16-METHYL-17-AMINO-ANDROSTANE
Pietro de Ruggieri, Carmelo Gandolfi, and Domenico Chiaramonti, Milan, Italy, assignors to Ormonoterapia Richter S.p.A., Milan, Italy, a corporation of Italy
No Drawing. Filed Nov. 13, 1962, Ser. No. 237,358
Claims priority, application Italy May 30, 1961
6 Claims. (Cl. 260—397.5)

The present invention relates to compounds of the general formula:

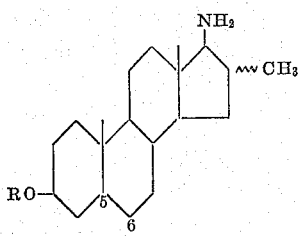

where R is a member of the group consisting of hydrogen and a lower alkanoyl radical, such as an acetyl radical and the bond between carbon atoms 5 and 6 is either a single or a double bond. If the bond is single, the hydrogen atom at position 5 is α-orientated.

These amines are useful as intermediates for the preparation of physiologically active hormones, and are, per se, active on the central nervous system, acting as hypotensive agents because of their ganglioplegic activity. They are prepared from the corresponding alkoxy-ethylidene-amino derivatives obtained according to copending U.S. patent application Serial No. 75,091, filed December 12, 1960 and now abandoned. The method includes the reduction of 16-methyl-17β-(1'-alkoxy-ethylidene-amino)-androstanes with sodium or zinc amalgam in acid medium to give the corresponding 16-methyl-17β-amino-androstanes.

The following examples serve to illustrate the present invention but are not to be construed as limiting the same:

EXAMPLE 1

*16α-Methyl-17β-Amino-3β-Acetoxy-5α-Androstane*

1 part of 3β-acetoxy-16α-methyl-17β-(1'-ethoxy-ethylidene-amino)-5α-androstane melting point 155–157° C. (see patent application Serial No. 75,091) was dissolved in 30 parts of tetrahydrofurane and 20 parts of 3 N HCl. At 5–10° C., 20 parts of 5% sodium amalgam were added and the reaction mixture was maintained at 5–10° C. for 3 hours with stirring. The resulting mixture was decanted from the mercury, diluted with 100 parts of water and made alkaline with NaOH. The precipitated product, filtered and recrystallized from methanol melts at 135–137° C.; $[\alpha]_D = -15°$ (chloroform).

EXAMPLE 2

*16α-Methyl-17β-Amino-5α-Androstane-3β-Ol*

A zinc amalgam was prepared by agitating for 5 minutes a mixture of 32 parts of powdered zinc, 3.2 parts of $HgCl_2$, 1.6 parts of concentrated HCl and 64 parts of water and then decanting. The zinc amalgam was suspended by stirring in 24 parts of water, 60 parts of tetrahydrofurane and 32 parts of concentrated HCl cooled to 5° C. and then there was added 8 parts of 16α-methyl-17β - (1' - ethoxy-ethylidene-amino)-5α-androstane-3β-ol, melting point 157–159° C. (see patent application Serial No. 75,091) dissolved in 120 parts of tetrahydrofurane and 8 parts of 4 N HCl. The mixture was then refluxed for 8 hours, adding 5 parts of concentrated HCl every hour. After the resulting mixture was cooled and made alkaline, it was extracted with chloroform, washed with water and the solvent evaporated. The residue was recrystallized from methanol to give 6.1 parts of 16α-methyl-17β-amino-5α-androstane-3β-ol melting at 161–163° C.; $[\alpha]_D = -10°$ (chloroform).

By using one of the methods of Examples 1 and 2, and starting with 16α-methyl-17β-(1'-ethoxy-ethylidene-amino)-androst-5-en-3β-ol (see application Serial No. 75,091), there is obtained 16α-methyl-17β-amino-androst-5-ene-3β-ol melting at 168–171° C.; $[\alpha]_D = -85°$ (chloroform).

Starting with 16β-methyl-17β-(1'-ethoxy-ethylidene-amino)-androst-5-en-3β-ol (see application Serial No. 75,091), there is obtained 16β-methyl-17β-amino-androst-5-en-3β-ol melting at 194–196° C.; $[\alpha]_D = -13°$ (chloroform).

Starting with 16β-methyl-17β-(1'-ethoxy-ethylidene-amino)-5α-androstane-3β-ol (see application Serial No. 75,091), there is obtained 16β-methyl-17β-amino-5α-androstane-3β-ol melting at 228–231° C.; $[\alpha]_D = +9°$ (chloroform).

The present application is a continuation-in-part of our copending application Serial No. 123,091, filed July 11, 1961 and now abandoned.

We claim:
1. The compounds of the formula

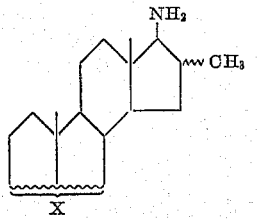

wherein X is a member selected from the group consisting of

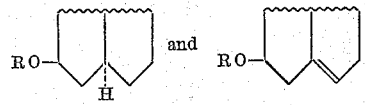

wherein R is a member selected from the group consisting of hydrogen and lower alkanoyl.
2. 16α-methyl-17β-amino-5α-androstane-3β-ol.
3. 16α-methyl-17β-amino-3β-acetoxy-5α-androstane.
4. 16α-methyl-17α-amino-androst-5-en-3β-ol.
5. 16β-methyl-17β-amino-androst-5-en-3βol.
6. 16β-methyl-17β-amino-5α-androstane-3β-ol.

References Cited in the file of this patent

Schmidt-Thome: Chemical Abstracts, vol. 48, November 1954, par. 13,738 b–h.
Nomine et al.: "Tetrahedron" (1960), pages 217, 220.